F. I. JOHNSON.
CONDUIT END PROTECTOR.
APPLICATION FILED OCT. 16, 1917.
1,381,073.
Patented June 7, 1921.
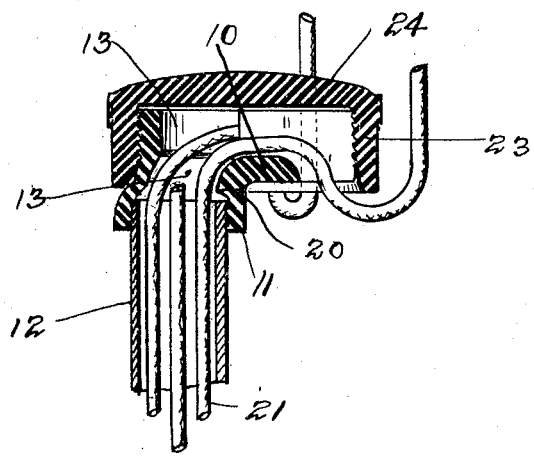
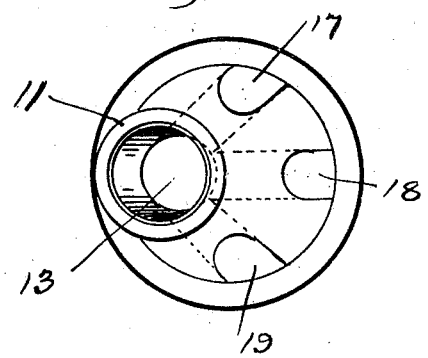
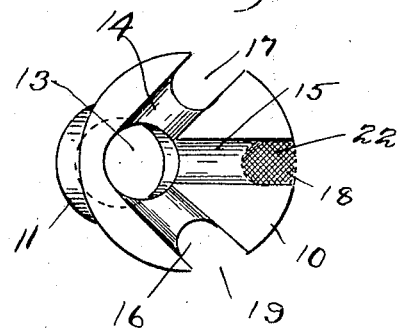
Inventor
Frederick I. Johnson
By Howard E. Barlow
Attorney

UNITED STATES PATENT OFFICE.

FREDERICK I. JOHNSON, OF WARREN, RHODE ISLAND.

CONDUIT-END PROTECTOR.

1,381,073.　　　　Specification of Letters Patent.　　Patented June 7, 1921.

Application filed October 16, 1917. Serial No. 196,936.

*To all whom it may concern:*

Be it known that I, FREDERICK I. JOHNSON, a citizen of the United States, and resident of the town of Warren, in the county of Bristol and State of Rhode Island, have invented certain new and useful Improvements in Conduit-End Protectors, of which the following is a specification.

This invention relates to weather caps for conduit ends of the class more particularly adapted for use in covering and protecting the end of a conduit from which the electric wires are led into a building.

The object of this invention is to provide such a conduit end protector comprising a body member having a conduit-receiving opening through which the wires are led, the face of the body being provided with one or more radial wire receiving grooves through which the wires are led outward from the conduit and a cap connected to said body portion for covering and protecting the whole to prevent foreign matter such as rain or snow from working into the conduit.

With these and other objects in view, the invention consists of certain novel features of construction, as will be more fully described, and particularly pointed out in the appended claim.

In the accompanying drawings.

Figure 1— is a sectional side elevation illustrating the general arrangement of the parts of my improved conduit-end protector.

Fig. 2— is a view of the under side of the end protector.

Fig. 3— is a view showing the top of the body portion with the cap member removed.

Referring to the drawings, 10 designates the body member of my improved conduit-end protector which is preferably formed of molded, insulating material and in a circular form. This body member is provided on its under side with a hub 11 offset from its center and which is provided with an opening 13 that extends through the body portion to its upper face. This hub is internally threaded for the reception of the threaded end of the metal conduit 12. The reason for offsetting this hub is so that when the weather cap is secured to the conduit end, the conduit may rest substantially flush against the side of the building to which it is attached by means of the usual pipe clips (not shown).

One of the features of this invention is that the upper surface of this body member is provided with radial grooves 14, 15 and 16 leading from the conduit opening 13 to the periphery of this body member, and notches 17, 18 and 19 are formed in the edge of the body member communicating with their respective grooves, whereby when the wires are led up through the conduit and opening 13 each may be laid into its groove and then bent down through its notch and so led out clear of the body member without having to thread the ends through any portion of the device.

The inner portion of the conduit-receiving opening 13 just above the end of the conduit at 20 is smaller in diameter than the inner diameter of the conduit so as to form or provide a bushing of insulating material over which the wires 21 are bent so as to prevent these wires from coming in contact with the metal end of the conduit, to prevent possible abrading, cutting or otherwise injuring the insulation on the wires.

In the majority of cases where the two wire system is employed the wires are placed in the two side grooves 16 and 17 and as the center groove 15 is not used the double cross-hatched section 22 is left in position therein to close it. In order that this section may be readily removed when desired, I have slit the same inwardly on both sides from its outer edge whereby it may be readily broken out when the device is employed in a three wire system.

The outer edge or periphery of this body member is threaded as at 23, which threads are preferably molded therein, and a cap 24 is provided also having molded threads on its inner surface adapted to be screwed onto the body portion, whereby after all of the wires have been positioned in their respective slots in the body portion, it is only necessary to screw this cap in position by hand and the whole is complete.

My improved conduit end protector is constructed of but two parts, the body portion and the cap.

There are no screws to be lost and no small threaded openings to be drilled and tapped for such screws. Both of the members of my improved device are adapted to be molded of insulating material complete into the desired form ready for use.

The foregoing description is directed solely toward the construction illustrated, but I desire it to be understood that I reserve the privilege of resorting to all the mechanical changes to which the device is susceptible, the invention being defined and limited only by the terms of the appended claim.

I claim:

A conduit-end protector comprising a substantially disk-shaped body member having a conduit-receiving neck through which the wires are led, said neck being offset to one side of the center of said body, the diameter of the opening in said neck beyond the end of the conduit being substantially equal to the inner diameter of the conduit, said body being of a substantial thickness and provided with one or more radially disposed wire-receiving grooves in its upper face communicating with said opening, and the edge of said body at the outer end of said grooves being notched to permit the wires to be led out downwardly therethrough, the periphery of said body about the notched edge being threaded, and a cap having its outer wall internally threaded to be screwed onto the said threaded edge of said body member after the wires have been positioned therein.

In testimony whereof I affix my signature in presence of a witness.

FREDERICK I. JOHNSON.

Witness:
HOWARD E. BARLOW.